United States Patent [19]

Budich et al.

[11] Patent Number: 4,514,449

[45] Date of Patent: Apr. 30, 1985

[54] PROFILE STRIP, ESPECIALLY FOR THE PRODUCTION OF WINDOW OR DOOR FRAMES

[75] Inventors: Wolfgang Budich, Troisdorf-Eschmar; Bertram Gasper, Troisdorf-Spich; Josef Kurth, Troisdorf-Spich; Karl-Günter Scharf, Troisdorf-Spich; Waldemar Wissinger, Siegburg, all of Fed. Rep. of Germany

[73] Assignee: Dynamit Nobel Aktiengesellschaft, Troisdorf, Fed. Rep. of Germany

[21] Appl. No.: 461,871

[22] Filed: Jan. 28, 1983

[30] Foreign Application Priority Data

Jan. 29, 1982 [DE] Fed. Rep. of Germany ....... 3202918

[51] Int. Cl.[3] ......................... B32B 5/16; B32B 27/30

[52] U.S. Cl. .................................... 428/76; 52/309.1; 428/174; 428/188; 428/212; 428/325; 428/332; 428/515

[58] Field of Search ..................... 428/36, 34, 76, 500, 428/515, 188, 174, 325, 332, 141, 212; 523/220; 52/171, 309.1, 312, 397, 782, 398; 49/504

[56] References Cited

U.S. PATENT DOCUMENTS 4,420,920 12/1983 Hewitt ................................. 428/34

FOREIGN PATENT DOCUMENTS 1498450 1/1978 United Kingdom .

*Primary Examiner*—Paul J. Thibodeau

*Attorney, Agent, or Firm*—Antonelli, Terry & Wands

[57] ABSTRACT

A profile strip, especially suitable for the production of window or door frames, has an optionally hollow core profile made from a glass fiber-reinforced PVC composition and a shell made from a synthetic resin compatible with PVC and exceeding the impact resistance of the core profile.

16 Claims, 7 Drawing Figures

PROFILE STRIP, ESPECIALLY FOR THE PRODUCTION OF WINDOW OR DOOR FRAMES

Figure 1:
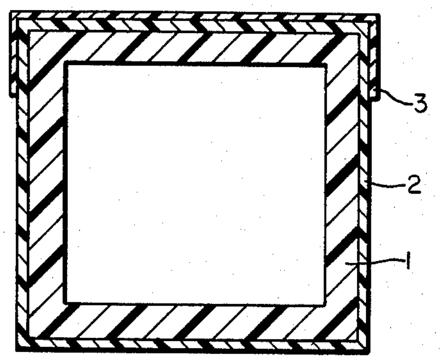

This invention relates to a profile strip, especially suitable for the production of frames for windows or for doors, having an optionally hollow core profile of a reinforced synthetic resin and a shell of a synthetic resin surrounding the core profile.

Hollow profiles for the manufacturing of window or door frames are known which consist of a core profile of steel or the like coated with a synthetic resin layer, especially a layer of plasticized polyvinyl chloride (PVC). Furthermore, inherently rigid hollow profiles of a synthetic resin, especially nonplasticized PVC, have been known for a long time for the production of window or door frames; however these profiles, in case of very large dimensions of window and door openings, must additionally be rigidified in the hollow portion, i.e., internal cavity by the insertion of reinforcing profiles of steel or aluminum.

Attempts have also been made to provide mechanically more rigid and stronger plastic hollow profiles for window and door frames and are described, for example, in German Patent No. 1,086,032 wherein the hollow profiles formed into a frame are subsequently filled with a liquid or plastic-flow filling material, thereby, after the hardening process, the individual frame sections are simultaneously bonded together. An example for such a filling material is a phenolic resin or plastic wood, in the frame for windows or doors disclosed in Swiss Pat. No. 411,301, hollow profiles of an elastic synthetic resin, especially based on polyvinyl chloride are likewise filled with a hardening filling material based on plastic cement, for example, expanded polystyrene with an addition of cement or epoxy resin with additives of grainy materials, such as sand, aluminum scrap, vermiculites, or the like, to increase strength. The profile strip for building components known from German Utility Model No. 1,994,127 uses a core of cheap materials, such as low-quality synthetic resins, slag stones, pressed wood scrap, or the like; this core is encompassed by a shell extending all the way around and made of a high-quality synthetic resin. Also, efforts have been made, according to DOS (German Unexamined Laid-Open Application) No. 2,326,911, to produce window frame profiles encased by synthetic resin wherein a core of expanded (i.e., foamed) plastic is surrounded by a compact (non-foamed) plastic shell; to increase the rigidity, the core can contain reinforcing inserts of light-metal pipes or plastic pipe. Another example for a compact, multilayer profile strip is described in DOS No. 2,827,851 wherein a hollow synthetic resin profile, especialy one of PVC, is filled with a synthetic resin filling of a matrix of methyl methacrylate with hollow silicate spheres, and wherein additionally glass filaments are embedded to extend in the longitudinal direction of the profile strip to increase rigidity. In all of these solid, multilayer profile strips, difficulties are encountered in each case in establishing perfect, tight connections at corners and butt joints of the profile strips which are watertight and provide full wind protection and exhibit a sufficiently high strength, and which are to be readily producible by conventional methods.

Moreover, French Pat. No. 1,602,375 describes a hollow profile strip made up of two layers, consisting of a hollow profile of glass-reinforced polyester, forming the core, the latter being encased on the outside by another glass fiber impregnated with a synthetic resin. Difficulties are also encountered in connection with this profile in establishing perfect, firm connections at corners and butt joints of the profiles.

This invention is based on the object of providing a profile strip for the manufacture of window or door frames, which strip satisfies the requirements regarding weatherability, meets the demands regarding mechanical strength and rigidity, provides a maximally simple connecting technique for joining the profiles into frames, especially by welding, affords the economy inherent in a mass-produced article by the use of inexpensive materials, and is distinguished by maximally simple workability.

The invention attains the posed objective by means of a profile strip having a core profile that is made up of a glass fiber-reinforced polyvinly chloride resin composition containing, per 100 parts by weight of polyvinyl chloride having a K value of between 55 and 75, 40–100 parts by weight of glass fibers having a diameter of between 5 and 25 $\mu m$ with a length of up to 12 mm, and 0–25 parts by weight of a mineral filler with an average particle diameter of below 50 $\mu m$, and exhibits a microporous, slightly roughened surface; the core profile being joined to an outer shell made up of a synthetic resin compatible with polyvinyl chloride and surpassing the impact strength of the core profile.

By the use of a hollow core profile based on glass fiber-reinforced PVC according to this invention, a rigid, firm structure is obtained exhibiting a high modulus of elasticity and being highly stable dimensionally, i.e., the stresses built in during processing of the composition into the profile strip are not triggered, even at high temperatures of up to 100° C. (Distortion of the profile is thereby avoided). Since the core profile does not lend itself readily to dyeing due to the high glass fiber proportion, i.e., it exhibits essentially a grey-yellow coloring, determined by the glass fiber, the shell not only takes over the task of forming a smooth surface, but also of imparting color to the composite or combined profile. Moreover, a substantial feature of the invention resides in that the impact strength of the combined profile, the core of which is relatively brittle on account of the glass fiber proportion, is increased by an appropriate selection of a high-impact-strength material, for the shell which is free of glass-fibers. It proves to be especially advantageous that the core profile, due to the high glass fiber proportion, exhibits a slightly rough surface with a microporous structure, whereby the synthetic resin shell finds especially good anchorage, and a particularly good adhesion or high adhesive strength is achieved between core profile and shell, directly and without additional adhesion-promoting means.

The glass fiber-reinforced polyvinyl chloride composition selected, according to this invention for the core profile, shows a very good processability by extrusion and a balanced spectrum of physical properties, even with the use of relatively minor proportions of mineral powdery fillers together with a relatively high proportion of glass fibers. In particular, the composition exhibits, in the extrusion direction, a modulus of elasticity of at least 8000 $N/mm^2$ at 23° C., measured according to DIN (German Industrial Standard) 53457.

The term "polyvinyl chloride resin" as used herein is meant to include polyvinyl chloride (i.e., homopolymer) produced by bulk, suspension, or emulsion polymerization with a K value of between 55 and 75 whereby the K-value refers to the homopolymer content of vinyl chloride as well as polyvinylidene chloride; post-chlorinated polyvinyl chloride; and modified polyvinyl chloride; i.e., the copolymers obtained from a chlorinated vinyl monomer and at least one monomer copolymerizable therewith, for example, a homopolymer, or copolymer and/or graft polymer of vinyl chloride with, for example, ethylene-vinyl acetate, methyl acrylate, vinyl acetate, chlorinated polyethylene, butadiene, polyolefins, or the like, as the co- or graft component, as well as mixtures of these materials wherein the vinyl chloride or the polyvinyl chloride constitutes at least about 75% by weight of the total weight of the polymeric material.

The mineral fillers in addition to the glass fibers serve, when used in amounts up to 25 parts by weight, hardly to render the composition less expensive but rather, in essence, to improve the processing characteristics; the mechanical properties of the composition are only slightly affected. Too high a mineral filler content has a negative influence on the improvements of the mechanical properties which are to be brought about precisely by the use of glass fibers. Usable fillers are mineral fillers, such as, for example, natural or precipitated chalk, siliceous chalk, colloidal silicic acid, aluminosilicates, or hydrated alumina, with or without appropriate surface treatment, singly or in blends with one another. The particle size of the fillers is, if at all possible, not to exceed substantially the fiber diameter of the glass fibers; in other words, the maximum particle diameter of the filler is to be smaller than 50 $\mu m$, preferably smaller than 20 $\mu m$.

The starting material for glass fibers employed is constituted, depending on the processing method, either by endless or cut glass fibers having a preferred filament diameter of between 5 and 25 $\mu m$. In case of cut fibers, the initial length is to be at least 0.5 mm, preferably between 3 and 12 mm. By the processing and working operations, the initial length will be broken down anyway to a final length of between about 0.3 to 1.5 mm, for example, during extrusion. Basically, all types of glass fibers can be utilized for the invention as long as they are compatible with PVC. However, those fibers are used with preference which have been pretreated by an appropriate surface treatment with the addition of adhesion promoters, such as, for example, vinyl silane and substituted alkyl silanes; e.g., chloroalkyl, amino-alkyl, diaminoalkyl silanes, and others. However, this pretreatment takes place normally during the manufacturing process of the glass fibers, rather than in the processing of the PVC compositions. By the use of 40–100 parts by weight of glass fibers per 100 parts by weight of PVC according to this invention, a modulus of elasticity of at least 8000 $N/mmm^2$ is attained in the finished product.

Unmodified polyvinyl chloride exhibits, besides a good impact resistance, an only moderate notched impact resistance. Notched impact resistance is only slightly affected by the addition of glass fibers; however, the impact resistance is diminished thereby. For this reason, a polymeric modifier is added to the composition in accordance with the invention, such as, for example, ethylene-vinyl acetate copolymer, alkyl acrylate polymers, chlorinated polyethylene, alkyl acrylate-butadiene-styrene copolymer, methacrylate-butadiene-styrene copolymer, or the like, with up to 30 parts by weight per 100 parts by weight of PVC homopolymer.

As compared with the customary amounts of mold release additives in the processing of PVC, the compositions of this invention turn out to have an addition of mold release agent which is substantially increased over known compositions. This addition, in the composition of this invention, ranges preferably between 2.5 and 5.5 parts by weight of mold release agent per 100 parts by weight of polyvinyl chloride resin, the proportion of mold release agent rising with increasing proportion of glass fibers and fillers. The mole release agents known in the processing of PVC and PVC-containing molding compositions are utilized; i.e., normally mixtures of so-called internal mold release agents, in other words mold release agents well compatible with PVC, and so-called external mold release agents, in other words, products less readily compatible with PVC. Among the group of the internal mold release agents are, for example, glycerol mono-, di-, and triesters of natural or oxidized carboxylic acids having chain lengths of $C_{12}$ to $C_{40}$, fatty alcohols of the aforementioned chain lengths, neutral or alkaline metallic soaps, preferably stearates of the metals lead, cadmium, barium, calcium, magnesium and tin, wax esters, such as, for example, $C_{10}$ to $C_{40}$ alcohols esterified with $C_{12}$ to $C_{36}$ acids; phthalic acid esters of long-chain alcohols, etc. In the group of external mold release agents belong, for example, fatty acids, $C_{12}$ to $C_{40}$ and/or substituted (oxidized) fatty acids, paraffin oils and solid paraffins, polyethylenes and/or oxidized polyethylenes, fatty acid amides, silicone oils, and similar compounds.

Moreover, other additives customary in the processing of PVC-containing mixtures are utilized, in particular, thermal stabilizers, such as, for example, complex barium-cadmium soaps, lead salts and/or lead soaps, complex calcium-zinc soaps, alkylthin mercapto compounds, or alkyltin carboxylates; furthermore, organic stabilizers, such as epoxidized oils or esters, diphenylthioureas, phenylindole, arylic or alkylic or arylic-alkylic mixed phosphites, individually or in blends. Furthermore, it is also possible to add to the composition conventional antioxidants, such as, for example, sterically hindered phenols or bisphenols or the like, for the stabilization of, in particular, the modifying components and/or the co- or graft components. Preferred amounts range between 1 and 5 parts by weight of stabilizers per 100 parts by weight of PVC. Further conventional additives are processing aids, also plasticizing aids, and optionally colorants and others.

A preferred composition for the core profile, according to this invention, contains, per 100 parts by weight of PVC having a K value of between 55 and 75, 40–80 parts by weight of glass fibers having a diameter of between 5 and 25 $\mu m$ with a length of 0.5–12 mm, 1–15 parts by weight of a powdery mineral filler with an average particle diameter of below 50 $\mu m$, and 2.5–5.0 parts by weight of mold release agent, and up to 30 parts by weight of a polymeric modifier.

The core profiles produced from the composition exhibit, depending on glass proportion and filler proportion, a very fine microporous surface whereby adhesion to subsequent coatings, for example, on the basis of PVC or another thermoplastic, is substantially improved. The composition, according to this invention, can serve for the manufacture of core profiles, especially hollow core profiles, of a high mechanical rigidity and strength, which profiles are then encased subsequently or simulataneously with a non-reinforced thermoplastic on the same basis or some other basis, for example, by means of extrusion, lamination, or dipping. The encasing step can also be carried out only over part of the surface of the molded article. For surface finishing, compounds compatible with PVC are especially suitable, which compounds are optionally also particularly weather-resistant.

The core profiles of this invention make it possible to manufacture profile strips having mechanical properties which are substantially improved over the non-reinforced synthetic resin, so that these profile strips can be employed for supporting constructions and so that, for example, the use of metallic reinforcements widely used in profile constructions with the utilization of synthetic resins can be omitted, and/or the wall thicknesses of the profile strips can be reduced, thus saving material. The various components of the composition of this invention can be homogenized with one another according to known techniques for the preparation of extrusible mixtures, and can then be extruded.

A preferred outer shell is made up from a synthetic resin based on polyvinyl chloride, polyvinylidene chloride, post-chlorinated polyvinyl chloride, vinyl chloride copolymers obtained from a chlorinated vinyl monomer and at least one monomer polymerizable therewith, such as homo- or copolymers and/or graft polymers with, for example, ethylene-vinyl acetate, acrylate, vinyl acetate, chlorinated polyethylene, butadiene, polyolefins, or the like, and mixtures thereof, which can additionally contain additives, such as stabilizers, mold release agents, pigments, UV absorbents, processing aids, and modifiers. Another group advantageous for forming a shell for suitable thermoplastic synthetic resins is composed of those on the basis of alkyl acrylates or polymethacrylates, alkyl acrylate-butadiene-styrene or alkyl methacrylate-butadiene-styrene, or polyesters or polyvinyl fluoride or polyvinylidene fluoride and/or mixtures thereof.

To minimize use of material, it is proposed, according to this invention, to fashion the core profiles as hollow profiles, having wall thicknesses of between 1.0 and 10 mm, preferably, 2.0–4 mm. The shell which essentially has the task of surface finishing and contributes toward an increase in impact resistance and increases weatherability, has preferably wal thicknesses of 0.2–4 mm, especially 0.3–1.5 mm, it is also possible to produce the shell partially of two materials different from each other, for example, to provide a visible side of the combined profile with a shell from material A and the remaining side of the combined profile with a shell of material B, and/or to dye the shell differently in individual zones.

In a further development of the invention, it may, furthermore, be advantageous to build up the shell, at least in part, of multiple layers of various materials. This makes it possible to advantageously combine differing properties of the individual materials, thus meeting varying requirements posed for the product, unattainable with only a single material. A preferred version of the invention provides that the shell be preferably equipped with a cover layer, partially covering the shell, made of a weather-resistant synthetic resin which is also readily dyeable, especially on an alkyl acrylate basis; e.g., methyl methacrylate, in a thickness of 0.1–1.2 mm. In this connection, this additional cover layer can be applied by coextrusion, but also by laminating with a sheet or by spread-coating.

Since the core profile with a high glass fiber proportion is relatively brittle, but exhibits low shrinkage with high rigidity and strength, it can be advantageous to improve the impact resistance of the multilayer profile by a corresponding treatment of the shell. In this connection, it is proposed that the shell contain, besides the polyvinyl chloride synthetic resin, up to 20% by weight of an impact resistance modifer, such as ethylene-vinyl acetate, chlorinated polyethylene, methacrylate-butadiene-styrene, polybutyl acrylate, acrylates, or the like.

The core profile of a glass fiber-reinforced polyvinyl chloride is to take over substantially the task of the rigidifying skeleton of the profile strip. A preferred embodiment of the invention provides that the shell is fashioned with profiling of the profile strip, such as grooves, projections, webs, undercut portions, or the like.

The multiple-layer profile strip of this invention is preferably manufactured by coextrusion; the strip is calibrated on the outside and exhibits a residual shrinkage of below 0.5%, especially below 0.3%. The multiple-layer product, according to this invention, exhibits, as compared with mere synthetic resin profiles of nonplasticized PVC, a substantially increased modulus of elasticity and, thus, a larger rigidity and torsional firmness, higher strength and, thus, greater safety against breakage, and an almost complete reduction; i.e., a reduction approaching zero, of the shrinkage that can be triggered thermally. Especially in case of utilization in climatic zones having great temperature fluctuations, warping of the profile by heat irradiation is avoided, and a substantial reduction of the thermal expansion coefficient is attained, thus, considerably lessening the tolerance problems encountered in the manufacturing of the frames and, therefore, also reducing the processing problems.

Moreover, the advantage is achieved for the manufacture of the multiple-layer profile strips, according to this invention, that the core profile based on glass fiber-reinforced PVC needs to be thermally stabilized merely with respect to the PVC; whereas the shell must also be provided with additional stabilizers with regard to weatherability, UV absorbents, as well as pigments. This feature makes it possible, however, to achieve in total a more economical product by the reduced usage of expensive materials with a simultaneous substantial improvement especially in the mechanical properites.

Since the multiple-layer profiles of this invention with a glass fiber-reinforced polyvinyl chloride core profile exhibit a very low shrinkage, the profiles can also be exposed to higher thermal stresses during weathering; i.e., they can also be heated up to a greater extent by solar radiation without triggering improper stresses which can lead to an undue shrinkage of the profile. This makes it possible, then, to dye the multiple-layer profiles of this invention on the outside in the shell and/or cover layer also in dark colors, such as brown, black, and dark green, as frequently required by architects for esthetic reasons. Such a dark coloring is impossible, for example, with nonplasticized PVC profiles, since such profiles shrink when certain heating-up temperatures are exceeded, due to triggering of stresses, to such an extent that the frames burst open.

It has been found, surprisingly, that the profile strip, according to the invention, with glass fiber-reinforced core profile can be perfectly welded in spite of the high glass fiber proportion, and satisfactory weld strengths are obtained, as required; in particular, also in the manufacture of frames for windows or doors.

The invention will be described as illustrated in the accompanying drawings with reference to several embodiments wherein:

FIGS. 1 through 6 show cross sections of various multiplie-layer profile strips arranged in accordance with this invention.

FIG. 1 shows schematically a hollow core profile 1 made of glass fiber-reinforced polyvinyl chloride and provided on the outside with a thin shell 2 of a non-reinforced thermoplastic synthetic resin such as, for example, nonplasticized PVC or ABS. Additionally, a portion of the periphery of the shell is directly bonded to a cover layer 3 made of a synthetic resin different from that of shell 2, for example, a weatherable synthetic resin such as polymethyl methacrylate. It is also possible to apply here, for example, a very thin polyvinylidene fluoride or polyvinyl fluoride film by laminating with the aid of an adhesion-promoting layer.

Figure 2:
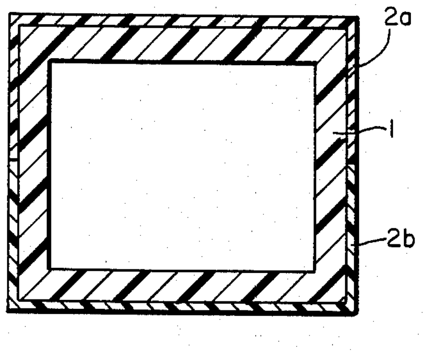

FIG. 2 shows schedmatically a glass fiber-reinforced hollow core profile 1 provided on the outside with a shell 2 composed partially, in zones *2a* and *2b*, of differing materials; e.g., zone *2a* rigid PVC with suitable Ba-cd-stabilizer or lead stabilizer and phosphite and epoxy soybean oil and wax ester and for white color $TiO_2$ pigments whereas zone *2b* is the same but instead of $TiO_2$ colored with anthrachinone dyestiff chromophtal brown, in differing colors.

Figure 3:
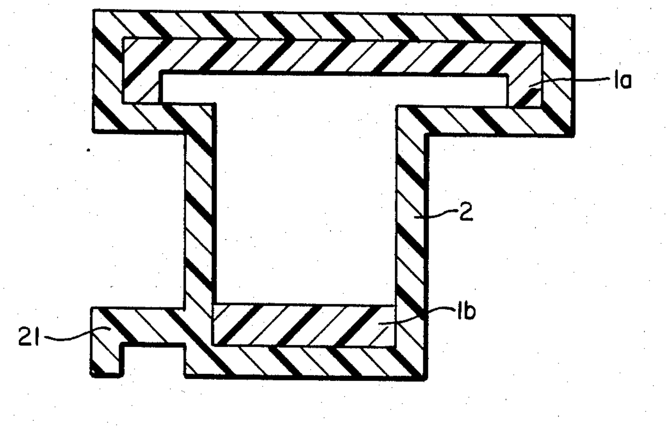

FIG. 3 show a profile strip comprising two core profiles *1a*, *1b* of glass fiber-reinforced polyvinyl chloride as the rigidifying inner skeleton, and a firm thermoplastic, profile-imparting shell 2, for example, of nonplasticized PVC. The profile-imparting shell 2 here gives to the profile the external shape inclusive of projections 21.

Figure 4:
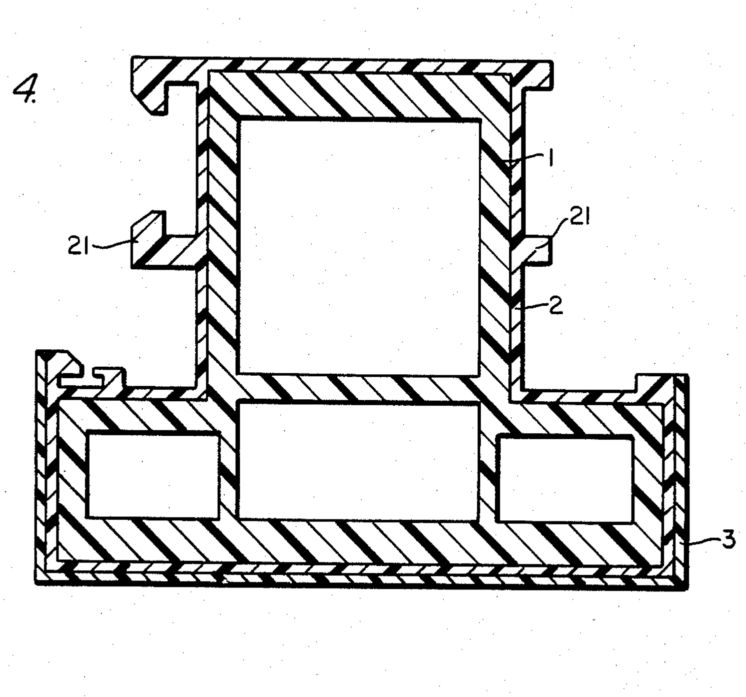

In FIG. 4, a T-shaped profile strip is shown exhibiting a multichambered, hollow core profile 1 of glass fiber-reinforced PVC imparting to the profile the required rigidity, strength, torsional firmness, and modulus of elasticity. This core profile 1 is provided with a shell 2 of a thermoplastic synthetic resin, the shell comprising additional, profile-imparting configurations in the form of projections 21, etc. Furthermore, this profile can also be provided, for example, with a cover layer 3 on the weather side, which layer is particularly weather-resistant and can be dyed differently from the color of the shell 2. Preferably, such a profile, according to FIG. 4, is manufactured by coextrusion, the bonding of the layers 1, 2, 3 being accomplished without adhesion promotors; the multiple-layer profile 1, 2, 3 receives its final shape in a single calibrating tool, provided that this component contains thermoplastic materials compatible wth one another.

Figure 5:
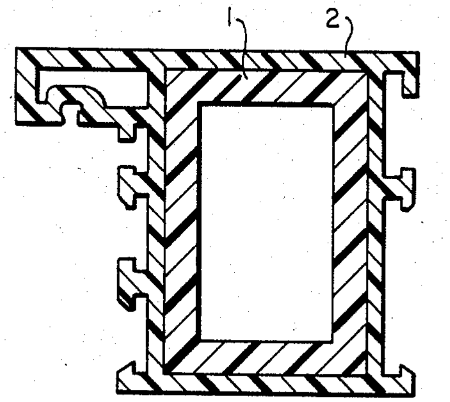

FIG. 5 shows another possibility for constructing and using the invention; in this case, a core profile 1, of a very simple structure in rectangular profile form, is equipped with a shell 2 of a suitable synthetic resin realizing a complicated profile configuration. Also such a profile can be preferably produced by coextrusion.

Figure 6:
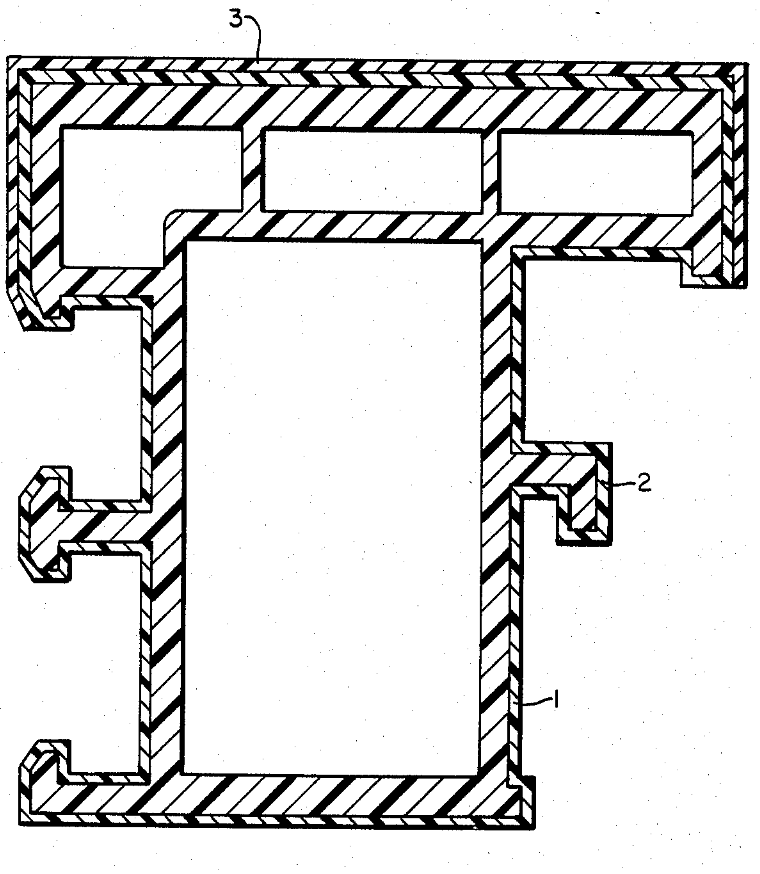

FIG. 6 shows a further embodiment of the invention, demonstrating that it is also possible to fashion the core profile 1 of glass fiber-reinforced PVC with a complicated profiling and with several hollow chambers, the shell 2 then adapting itself to the profiling of the core profile 1. Here again, another surface finish 3 can be additionally provided, extending over part of the periphery, but optionally also over the entire periphery of the profile.

It can be seen from the above description of the figures that, in each case, the supporting profile is the core profile 1 of glass fiber-reinforced polyvinyl chloride. The shell of nonreinforced thermoplastic synthetic resin free of glass fibers, such as, for example, nonplasticized PVC or acrylate, and, optionally, still another cover layer of some other material and, optionally, also dyed a different color from that of the shell, refine the properites of the core profile. The multiple-layer profile is preferably extruded; in this connection, the thicknesses of the individual layers can be the same, or they can also be different, depending especially also on the static load with optimum utilization of the properties of the material layers. Since the core profile of glass fiber-reinforced PVC exhibits very good mechanical characteristics, it can be manufactured with a cross section that is simplified as compared with mere nonplasticized PVC profiles.

The shell layer has not only the task of smoothing and sealing the surface of the core profile which may be porous and rough, but also is to enhance appearance and increase weaterability. Moreover, due to the thermoplastic shell layer, the calibrating tool, while calibrating the multiple-layer profile, is under less stress along the walls than if a glass fiber-reinforced material would have to be calibrated directly. In this way, the shell also reduces wear and tear when manufacturing the profiles in metallic tools.

Figure 7:
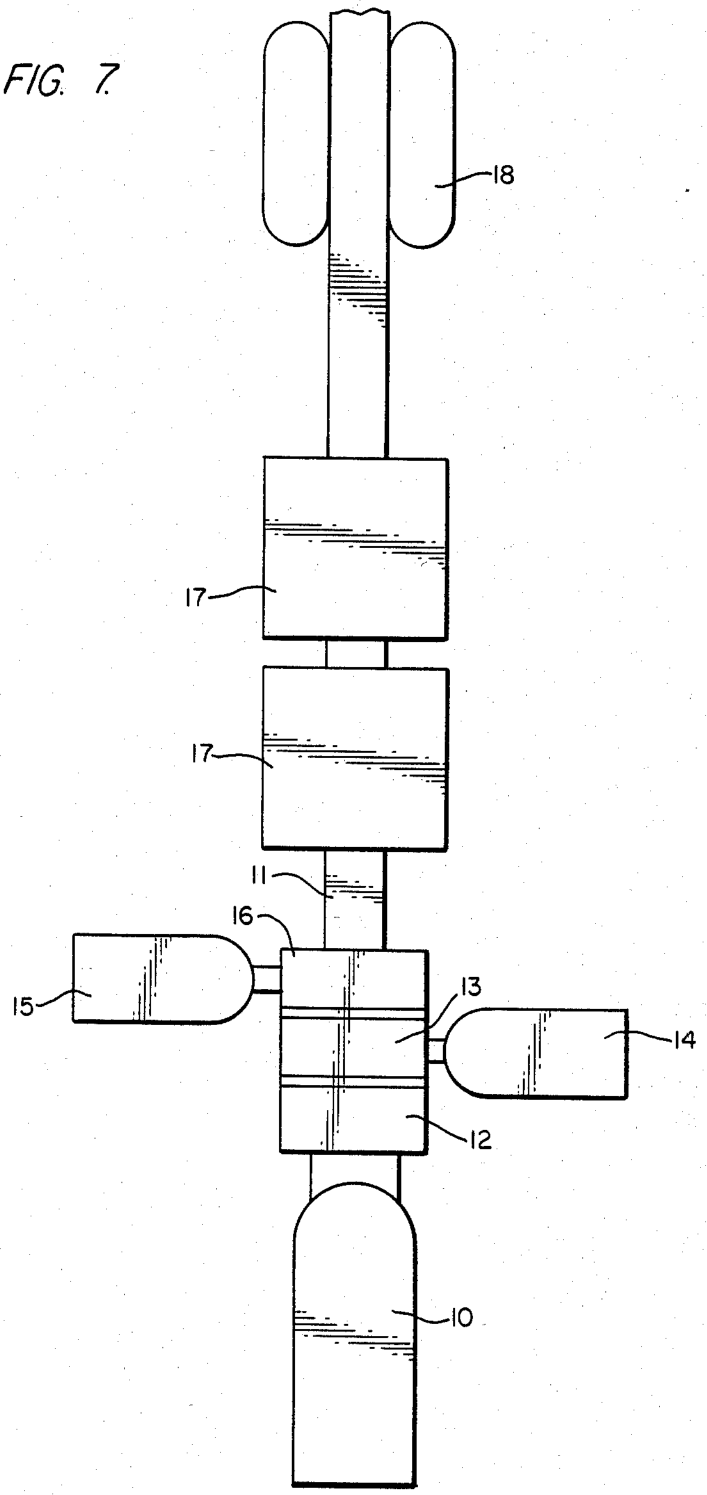

FIG. 7 shows, schematically, an extrusion installation for the production of the multiple-layer profile, according to this invention, by coextrusion. Numeral 10 denotes the primary extruder for extruding the glass fiber-reinforced polyvinyl chloride composition for the core porfile; the extrusion die 12 to shape the core profile is connected in front thereof. The extrusion die 13 for shaping the shell 2 follows, the synthetic resin for the shell being supplied by the extruder 14. Finally, the extrusion die 15 is connected to this arrangement for a third layer, the cover layer material being fed to this die via the extruder 16. The multiple-layer profile 11 leaving the extrusion die is then fed to the calibrating (sizing) tools 17; while passing through these calibrating tools, the final external dimensioning is imparted to the profile strip, and the latter is cooled. Take-off takes place via the take-off means 18. Additionally, the profile can also be cooled internally, for example, by means of water.

In Examples 1 through 12, set forth below, the properties of the glass fiber-reinforced core profiles, with and without modifier, as used according to this invention are described. Examples 13 and 14 show compositions without glass fiber reinforcement, one without filler, the other with filler for comparison purposes.

The examples are listed in the following table. In order to produce the PVC-containing composition, the components are mixed in dry, powdery form and plasticized; this composition is used to extrude panels having a thickness of about 4 mm and a width of 500 mm with the aid of, for example, a single-screw extruder. For purposes of extrusion, a plasticizing temperature is required in the barrel of 160–190° C. with a die temperature of 195° C.

The components of the composition, according to the examples, are expressed in parts by weight; a suspension PVC having a K value of 64 is used for Examples 1–7 and 13, 14; and a suspension PVC having a K value of 57 is utilized for Examples 8–12. The various modifiers employed in Examples 4–12 are characterized by their abbreviations.

The properties are measured on the extruded panels; namely, respectively, in the longitudinal and transverse directions. The modulus of elasticity is determined, according to DIN (German Industrial Standard) 53457; the notched impact strength according to Izod FT-LOS/IN; the tensile stress at break according to DIN 53455; the elongation at break according to DIN 53455, and the deflection temperature under load, method A, in °C. according to ISO R 75.

It can be seen, when comparing Examples 13 and 14 without glass fibers with the examples according to this invention, that the modulus of elasticity rises by the addition of glass fibers; whereas the tensile stress at break is already somewhat on the decline. By the addition of small amounts of a mineral filler, in this case calcium carbonate according to Example 2, it is possible, however, to considerably improve again the modulus of elasticity as well as the other mechanical properties, except for the elongation, as compared wth Example 1 which lacks the mineral filler.

Examples 14 and 3 show, in a comparative series, how in case of non-reinforced PVC the property spectrum of the mechanical characteristics is altered after adding glass fibers for reinforcing purposes, with a constant proportion of mineral filler, here calcium carbonate. Increased addition of mineral fillers to the glass fibers does not result in an essential improvement of properties; rather, the properties are approximately in equilibrium using the relationships chosen according to this invention; i.e., with a slightly dropping modulus of elasticity and notched impact resistance, with a still rising tensile stress at break, good properties are obtained also in comparison with the product without mineral fillers, see Example 1.

Example 4 discloses a composition containing an impact strength modifier to increase notched impact resistance, but this is done at the cost of, in particular, the modulus of elasticity and the tensile stress at break. This property can then be improved again just by minor additions of a mineral filler, such as calcium carbonate, according to Example 5. Examples 6 and 7 provide further addition of modifiers in higher proportions, but the modifiers, in spite of an increase in notched impact resistance, do not exert an enchancing effect on the mechanical properties, in particular, but rather have an adverse effect thereon. Examples 8 through 12 show the addition of relatively small proportions of modifiers to raise notched impact resistance with a constant addition of small amounts of calcium carbonate, while raising the glass fiber proportion. These examples demonstrate the improvement in modulus of elasticity with an increased glass fiber proportion with a simultaneous preservation of the notched impact resistance values and the tensile stress at break values to the desired extent. With the notched impact resistance, the impact resistance of these compositions is, likewise, improved.

The substantially improved properties attainable with the profiled strip constructed according to this invention, as compared with conventional profiles of synthetic resin for the manufacture of windows or doors, were tested by production of profiles by means of coextrusion, according to FIG. 6, but without a cover layer 3. In this procedure, a core profile was used made up of a composition according to Example 8 of glass fiber-reinforced PVC, the core profile having a wall thickness of 3 mm. Additionally, a shell with profiling was extruded from a nonplasticized PVC composition, according to Example 13 having an average wall thickness of 0.5 mm. Furthermore, the profile, according to FIG. 6, was extruded merely from the nonplasticized PVC composition, according to Example 13.

TABLE 1

| | Examples | | | | | | | | |
|---|---|---|---|---|---|---|---|---|---|
| | 1 | 2 | 3 | 4 | 5 | 6 | 7 | 8 | 9 |
| S PVC, K Value 64 (57) | 100 | 100 | 100 | 85 | 85 | 70 | 80 | 100 (K 57) | 100 (K 57) |
| Stabilizer Mixture | 3 | 3 | 3 | 3 | 3 | 3 | 3 | 4 | 4 |
| Modifier | — | — | — | 15 MBS | 15 MBS | 30 MBS | 20 CPE | 10 (EVA) | 10 (EVA) |
| Glass Fibers, Length 6 mm, $\phi$ 10 $\mu$m | 50 | 50 | 50 | 50 | 50 | 50 | 50 | 50 | 60 |
| $CaCO_3$ (Average Particle $\phi$ < 10 $\mu$m) | — | 5 | 25 | — | 5 | — | — | 5 | 5 |
| 1,2-Hydroxystearic Acid | 0.3 | 0.3 | 0.6 | 0.3 | 0.3 | 0.3 | 0.3 | 0.2 | 0.2 |
| Oxidized PE Wax | 0.5 | 0.5 | 0.7 | 0.5 | 0.5 | 0.5 | 0.5 | — | — |
| Ca Stearate | 1.0 | 1.0 | 1.0 | 1.0 | 1.0 | 1.0 | 1.0 | 1.0 | 1.0 |
| C 16/18 Wax Esters/Epox. Soybean | 1.0 | 1.0 | 2.0 | 1.0 | 1.0 | 1.0 | 1.3 | 3 | 3 |
| Modulus of Elasticity $N/mm^2$ at 23° C. | | | | | | | | | |
| transverse | 4,680 | 5,010 | 4,890 | 3,660 | 4,070 | 3,150 | 3,580 | 4,230 | 4,550 |
| longitudinal | 12,160 | 11,360 | 11,500 | 10,260 | 11,730 | 8,750 | 10,480 | 10,790 | 10,510 |
| Impact Resistance (Notched) (Izod) J/m | | | | | | | | | |
| transverse | 36 | 41 | 39 | 44 | 43 | 54 | 69 | 37 | 37 |
| longitudinal | 56 | 69 | 73 | 82 | 91 | 176 | 133 | 69 | 75 |
| Tensile Stress at Break $N/mm^2$ | | | | | | | | | |
| transverse | 27.3 | 36.3 | 38.2 | 29.2 | 31.4 | 25.4 | 24.6 | 33.9 | 32.4 |
| longitudinal | 78.8 | 86.8 | 72.7 | 70.1 | 98.9 | 72.7 | 64.6 | 83.8 | 91.2 |
| Elongation at Break, % | | | | | | | | | |
| transverse | 8 | 2 | 2 | 2 | 2 | 2 | 2 | 2 | 2 |
| longitudinal | 2 | 2 | 2 | 2 | 2 | 2 | 2 | 2 | 2 |
| Deflection Temperature under Load in °C. Method A ISO/R 75 | | | | | | | | | |
| transverse | 73 | 81 | 78 | 78 | 71 | 67 | 72 | 68 | 67 |
| longitudinal | 86 | 86 | 84 | 87 | 79 | 77 | 77 | 72 | 72 |

| | Examples | | | | |
|---|---|---|---|---|---|
| | 10 | 11 | 12 | 13 | 14 |

TABLE 1-continued

| | | | | | |
|---|---|---|---|---|---|
| S PVC, K Value 64 (57) | 100(K 57) | 100(K 57) | 100(K 57) | 100 | 100 |
| Stabilizer Mixture | 4 | 4 | 4 | 3 | 3 |
| Modifier | 10 (EVA) | 10 (EVA) | 10 (EVA) | 5 (EVA) | — |
| Glass Fibers, Length 6 mm, φ 10 μm | 70 | 80 | 100 | — | — |
| $CaCO_3$ (Average Particle φ < 10 μm) | 5 | 5 | 5 | — | 25 |
| 1,2-Hydroxystearic Acid | 0.2 | 0.3 | 0.4 | — | — |
| Oxidized PE Wax | — | — | — | 0.3 | 0.3 |
| Ca Stearate | 1.0 | 1.0 | 1.0 | 0.5 | 0.5 |
| C 16/18 Wax Esters/Epox. Soybean | 3 | 3.5 | 3.8 | 1.0 | 1.0 |
| Modulus of Elasticity $N/mm^2$ at 23° C. | | | | | |
| transverse | 4,860 | 4,880 | 5,870 | 2,700 | 3,700 |
| longitudinal | 12,730 | 15,560 | 20,670 | 2,800 | 3,900 |
| Impact Resistance (Notched) (Izod) J/m | | | | | |
| transverse | 39 | 39 | 53 | 95 | 54 |
| longitudinal | 80 | 59 | 72 | 130 | 67 |
| Tensile Stress at Break $N/mm^2$ | | | | | |
| transverse | 28.4 | 21.3 | 20.7 | 32 | 33.0 |
| longitudinal | 88.6 | 75.7 | 66.6 | 35.4 | 36.0 |
| Elongation at Break, % | | | | | |
| transverse | 2 | 2 | 2 | 32 | 43 |
| longitudinal | 2 | 2 | 2 | 55 | 53 |
| Deflection Temperature under Load in °C. Method A ISO/R 75 | | | | | |
| transverse | 66 | 69 | 66 | 74 | 75 |
| longitudinal | 75 | 77 | 76 | 75 | 77 |

MBS = Methylmethacrylate butadiene styrol copolymer
CPE = chlorinated polyethylene
EVA = ethylene vinyl acetate copolymer The profiles were used to measure the essential properties which are compiled in Table 2. In this connection, the superior properties of the profile, according to this invention, with a glass fiber-reinforced PVC core profile and a nonplasticized PVC shell become very clearly apparent, for example, as compared with a profile made up of mere nonplasticized PVC. The modulus of elasticity, significant for the flexural and torsional strength of the profiles, attains a value more than three times as high in the profile construction of this invention as in case of a mere nonplasticized PVC profile. In this way, the profile strips of this invention can be used to manufacture window and door frames having a greater flexural rigidity, which withstand higher loads and do not require additional metal reinforcements. This satisfactory characteristic also becomes apparent when comparing the tensile strengths and in the deflection test. The deflection test was conducted with a support spacing of 100 cm; a force more than twice as great was required for the profiles of this invention. Only the impact resistance of the profiles, according to the invention, is reduced as compared with a pure thermoplastic, on account of the brittle, glass fiber-reinforced PVC core profile. The low shrinkage values of the profile of this invention are of special advantage; these values point to a high dimensional stability and also are of special advantage in case of unilateral heating of the profiles when installed in window and door frames where sunlight impinges only on one side. Due to the low shrinkage of the profiles, according to this invention and the high modulus of elasticity thereof, a concave bending of the frames or frame profiles, when heated unilaterally, is reduced to a minimum value not impairing the functional capacity of the frames.

However, also surprising are the weld strengths attainable when welding the profiles of this invention under the same conditions as normal, nonplasticized PVC profiles; i.e., the so-called corner strength values. These are practically at an unchanged level.

TABLE 2

| Properties | Dimension | Profile Acc. to Composition of Example 13 | Profile with Core Acc. to Composition of Example 8 and Shell Acc. to Composition of Example 13 |
|---|---|---|---|
| Tensile strength | $N/mm^2$ | 47 | 75 |
| Elongation at break | % | 35 | 5 |
| Modulus of elasticity | $N/mm^2$ | 2,800 | 9,000 |
| Falling ball test 1 m K, 1 Kp, 23° C. | $KJ/m^2$ | unbroken | unbroken |
| (per RAL) 0° C. | | " | " |
| Shrinkage 1 h at 100° C. Air | % | 1.7 | 0.12 |
| Force at 3.3 mm deflection with support spacing of 100 cm | N | 175 | 440 |
| Corner strength, welded | N | 7,200 | 7,200 |
| Deflection after alternating temperature load | mm/m | −3.0 | −0.1 |
| Impact resistance 23° C. | $KJ/m^2$ | unbroken | 26 |
| −20° C. | | " | 30 |

What is claimed is:

1. A profile strip for the manufacture of frames for windows or doors comprising a core profile formed of reinforced synthetic resin and a synthetic resin shell surrounding at least a part of the core profile; said core profile being formed of a glass fiber-reinforced polyvinyl chloride resin-containing composition, additionally containing per 100 parts by weight of a polyvinyl chloride resin having a K value between 55 and 75, 40 to 100 parts by weight of glass fibers having a diameter of between 5 and 25 $\mu$m with a length of up to 12 mm, and 0 to 25 parts by weight of a mineral filler with an average particle diameter of below 50 $\mu$m; said core profile exhibiting a microporous, slightly roughened surface, and said core profile being bonded to the shell; said shell being free of glass fibers, being formed of a synthetic resin that is compatible with polyvinyl chloride resin and exceeding the impact resistance of the core profile and said strip exhibiting, in the extrusion direction, a modulus of elasticity of at least 8000 $N/mm^2$ at 23° C.

2. The profile strip according to claim 1, wherein the core profile furthermore contains up to 30 parts by weight of polymeric modifier per 100 parts of the polyvinyl chloride resin for increasing the impact strength of the core profile.

3. The profile strip according to claim 1, wherein the core profile furthermore contains 2.5–5.5 parts by weight of a mold release agent per 100 parts of said polyvinyl chloride resin.

4. A profile strip according to claim 1, wherein the core profile contains, per 100 parts by weight of polyvinyl chloride having a K value of between 55 and 75, 40–80 parts by weight of glass fibers having a diameter of between 5 and 25 m with a length of 0.5 to 12 mm, 1 to 15 parts by weight of a powdery mineral filler having an average particle diameter of below 50$\mu$m, and 2.5–5.0 parts by weight of a mold release agent, and up to 30 parts by weight of a polymeric modifier.

5. A profile strip according to claim 1, wherein the core profile has a wall structure that exhibits wall thicknesses of between 1.0 and 10 mm.

6. A profile strip according to claim 1, wherein the shell has a wall structure with a wall thickness of 0.2–4 mm.

7. A profile strip according to claim 1, wherein the shell is made up from a member selected from the group consisting of polyvinyl chloride, polyvinylidene chloride, post-chlorinated polyvinyl chloride, a copolymer obtained from a chlorinated vinyl monomer and at least one monomer copolymerizable therewith, a graft copolymer of vinyl chloride with ethylene-vinyl acetate, alkyl acrylate, vinyl acetate, chlorinated polyethylene, butadiene, polyolefin, and mixtures thereof, and also contains additives, including heat stabilizers, mold release agents, pigments, UV absorbents, processing aids and modifiers.

8. A profile strip according to claim 1, wherein the shell is made up from a member selected from the group consisting of polyalkyl acrylate, acrylate-butadiene-styrene copolymer, methyl methacrylate-butadiene-styrene copolymer, (MBS), polyester polyvinylidiene fluoride, (PVF), PVDF and mixtures thereof.

9. A profile strip according to claim 1, wherein the shell is partially composed of two materials different from each other.

10. A profile strip according to claim 1, wherein the shell is provided with a profiled configuration, and 11. A profile strip according to claim 1, wherein the shell is built up at least, in part, in a multiple-layer form of various polymeric materials.

12. A profile strip according to claim 11 further comprising a cover layer partially covering the shell, said cover layer being formed of a weather-resistant synthetic acrylate resin, having a thickness of 0.1–1.2 mm.

13. A profile strip according to claim 1, wherein the core profile is thermally stabilized and the shell is stabilized thermally and with respect to light.

14. A profile strip according to claim 1, wherein said strip is manufactured by coextrusion and calibrated on the outer surfaces thereof the profile strip exhibiting a residual shrinkage of below 0.5%.

15. A profile strip according to claim 7, wherein the shell contains, besides the synthetic resin, up to 20% by weight of a modifier comprising EVA, CPE or MBS.

16. A profile strip according to claim 1, wherein said polyvinyl chloride resin comprises a member selected from the group consisting of polyvinyl chloride having a K value of between 55 and 75, polyvinylidiene chloride, post chlorinated polyvinyl chloride, a copolymer of at 75% by weight of vinylchloride and at least one ethylenically unsaturated monomer, a graft copolymer of vinyl chloride acetate, methyl acrylate, vinyl acetate, chlorinated polyethylene, butadiene a polyolefin and mixtures thereof.

* * * * *